United States Patent
Sheridan

(10) Patent No.: US 10,053,212 B2
(45) Date of Patent: Aug. 21, 2018

(54) TRANSMISSION FOR COAXIAL MULTI-ROTOR SYSTEM

(71) Applicant: SIKORSKY AIRCRAFT CORPORATION, Stratford, CT (US)

(72) Inventor: William G. Sheridan, Southington, CT (US)

(73) Assignee: SIKORSKY AIRCRAFT CORPORATION, Stratford, CT (US)

(*) Notice: Subject to any disclaimer, the term of this patent is extended or adjusted under 35 U.S.C. 154(b) by 0 days.

(21) Appl. No.: 15/313,730

(22) PCT Filed: May 22, 2015

(86) PCT No.: PCT/US2015/032097
§ 371 (c)(1),
(2) Date: Nov. 23, 2016

(87) PCT Pub. No.: WO2015/183711
PCT Pub. Date: Dec. 3, 2015

(65) Prior Publication Data
US 2017/0190415 A1     Jul. 6, 2017

Related U.S. Application Data

(60) Provisional application No. 62/004,326, filed on May 29, 2014.

(51) Int. Cl.
*B64C 27/10* (2006.01)
*B64C 27/12* (2006.01)
(Continued)

(52) U.S. Cl.
CPC .............. *B64C 27/10* (2013.01); *B64C 27/12* (2013.01); *B64C 27/82* (2013.01); *F16H 1/46* (2013.01); *B64C 2027/8236* (2013.01)

(58) Field of Classification Search
CPC .......... B64C 27/10; B64C 27/12; B64C 27/82; B64C 2027/8236; F16H 1/46
See application file for complete search history.

(56) References Cited

U.S. PATENT DOCUMENTS 1,381,939 A * 6/1921 Small ..................... B63H 5/10
                                                  416/129
1,921,893 A * 8/1933 Steele .................... B64D 35/06
                                                 74/665 K (Continued)

FOREIGN PATENT DOCUMENTS

WO      2015183711 A1    12/2015

OTHER PUBLICATIONS

International Search Report for International Application No. PCT/US2015/32097; International Filing Date: May 22, 2015; dated Aug. 19, 2015; 8 pages.

(Continued)

*Primary Examiner* — Jacob S. Scott
*Assistant Examiner* — Tinh Dang
(74) *Attorney, Agent, or Firm* — Cantor Colburn LLP

(57) ABSTRACT

A coaxial, dual rotor system includes a first rotor assembly located at a rotor axis and rotatable thereabout and a second rotor assembly located at the rotor axis radially inboard of the first rotor assembly and rotatable thereabout. A rotationally fixed static mast is located radially between the first rotor assembly and the second rotor assembly. A transmission includes a rotor input shaft including a first sun gear and a second sun gear. A star gear arrangement is operably connected to the first sun gear and to the static mast to drive rotation of the first rotor assembly about the rotor axis and a planetary gear arrangement is operably connected to the second sun gear and to the static mast to drive rotation of the second rotor assembly about the rotor axis.

15 Claims, 4 Drawing Sheets

(51) Int. Cl.
    *B64C 27/82*     (2006.01)
    *F16H 1/46*     (2006.01)

(56) References Cited

U.S. PATENT DOCUMENTS

| | | | |
|---|---|---|---|
| 2,522,443 | A | 9/1950 | Gaubatz et al. |
| 2,700,311 | A * | 1/1955 | Bade .................... B64D 35/04 |
| | | | 475/330 |
| 3,252,355 | A | 5/1966 | Hewko |
| 4,216,925 | A | 8/1980 | Mendiberri |
| 4,783,023 | A | 11/1988 | Jupe |
| 4,964,315 | A | 10/1990 | Willis, Jr. |
| 5,791,592 | A | 8/1998 | Nolan et al. |
| 7,784,731 | B2 | 8/2010 | Lin |
| 9,156,562 | B2 * | 10/2015 | Buono .................... B64C 27/10 |
| 9,248,909 | B2 * | 2/2016 | Eller ...................... B64C 27/80 |
| 2013/0334362 | A1 | 12/2013 | Lauder |
| 2016/0167778 | A1 * | 6/2016 | Meringer ................ B64C 27/10 |
| | | | 244/17.23 |

OTHER PUBLICATIONS

Notification of Transmittal of the International Search Report and the Written Opinion of the International Searching Authority; PCT/US2015/032097; dated Aug. 19, 2015; ISR 8 pages; WO 6 pages.
PCT International Preliminary Report on Patentability; International Application No. PCT/US2015/032097; International Filing Date: May 22, 2015, dated Nov. 29, 2016, pp. 1-7.

* cited by examiner

TRANSMISSION FOR COAXIAL MULTI-ROTOR SYSTEM

CROSS REFERENCE TO RELATED APPLICATIONS

This application is a National Stage application of PCT/US2015/032097, filed May 22, 2015, which claims the benefit of U.S. Provisional Application No. 62/004,326, filed May 29, 2014, both of which are incorporated by reference in their entirety herein.

BACKGROUND

The subject matter disclosed herein relates to the art of rotary wing aircraft and, more specifically, to coaxial multi-rotor systems for rotary wing aircraft.

In typical rotary winged aircraft, for example, helicopters with dual coaxial rotor systems, rotary power is transmitted from an engine through a transmission into the rotor system. The transmission transfers power to a lower rotor shaft to drive a lower rotor assembly and to an upper rotor shaft coaxial with the lower rotor shaft to drive the upper rotor assembly. The systems typically include several sets of bearings between the upper rotor shaft and lower rotor shaft to transfer loads between the shafts. The bearings and controls for the upper rotor assembly drive an increased diameter for the upper rotor shaft, and thus the lower rotor shaft, which increases drag during operation. As such, many coaxial rotor systems include an aerodynamic fairing positioned between the upper rotor assembly and the lower rotor assembly. Typical systems attach to the upper and lower rotor shafts, and include a significant derotation mechanism to prevent the fairing from rotating, and to keep the fairing oriented in a selected direction.

BRIEF DESCRIPTION

In one embodiment, a coaxial, dual rotor system includes a first rotor assembly located at a rotor axis and rotatable thereabout and a second rotor assembly located at the rotor axis radially inboard of the first rotor assembly and rotatable thereabout. A rotationally fixed static mast is located radially between the first rotor assembly and the second rotor assembly. A transmission includes a rotor input shaft including a first sun gear and a second sun gear. A star gear arrangement is operably connected to the first sun gear and to the static mast to drive rotation of the first rotor assembly about the rotor axis and a planetary gear arrangement is operably connected to the second sun gear and to the static mast to drive rotation of the second rotor assembly about the rotor axis.

Additionally or alternatively, in this or other embodiments, the star gear arrangement includes a plurality of star gears interactive with the first sun gear. The plurality of star gears are located at the static mast and rotatably secured thereto. A first ring gear is fixed to the first rotor assembly and is interactive with the plurality of star gears to transfer rotation of the first sun gear to the first rotor assembly via the plurality of star gears.

Additionally or alternatively, in this or other embodiments, the planetary gear arrangement includes a second ring gear fixed to the static mast. A plurality of planet gears are rotatably secured to the second rotor assembly and interactive with the second sun gear and the second ring gear. The rotation of the second sun gear thus drives rotation of the second rotor assembly about the rotor axis.

Additionally or alternatively, in this or other embodiments, the first rotor assembly is driven in a first direction about the rotor axis and the second rotor assembly is driven about the rotor axis in a second direction opposite to the first direction.

Additionally or alternatively, in this or other embodiments a first rotor bearing supports the first rotor assembly at the static mast.

Additionally or alternatively, in this or other embodiments, a second rotor bearing supports the second rotor assembly at the static mast.

In another embodiment, a dual coaxial rotor rotorcraft includes an airframe, a drive system disposed at the airframe, and a coaxial, dual rotor system operably connected to the drive system. The rotor system includes a first rotor assembly located at a rotor axis and rotatable thereabout and a second rotor assembly located at the rotor axis radially inboard of the first rotor assembly and rotatable thereabout. A rotationally fixed static mast is located radially between the first rotor assembly and the second rotor assembly and fixed to the airframe. A transmission includes a rotor input shaft including a first sun gear and a second sun gear. A star gear arrangement is operably connected to the first sun gear and to the static mast to drive rotation of the first rotor assembly about the rotor axis and a planetary gear arrangement is operably connected to the second sun gear and to the static mast to drive rotation of the second rotor assembly about the rotor axis.

Additionally or alternatively, in this or other embodiments, the star gear arrangement includes a plurality of star gears interactive with the first sun gear. The plurality of star gears are located at the static mast and rotatably secured thereto. A first ring gear is fixed to the first rotor assembly and is interactive with the plurality of star gears to transfer rotation of the first sun gear to the first rotor assembly via the plurality of star gears.

Additionally or alternatively, in this or other embodiments, the planetary gear arrangement includes a second ring gear fixed to the static mast. A plurality of planet gears are rotatably secured to the second rotor assembly and interactive with the second sun gear and the second ring gear. The rotation of the second sun gear thus drives rotation of the second rotor assembly about the rotor axis.

Additionally or alternatively, in this or other embodiments, the first rotor assembly is driven in a first direction about the rotor axis and the second rotor assembly is driven about the rotor axis in a second direction opposite to the first direction.

Additionally or alternatively, in this or other embodiments a first rotor bearing supports the first rotor assembly at the static mast.

Additionally or alternatively, in this or other embodiments, a second rotor bearing supports the second rotor assembly at the static mast.

Additionally or alternatively, in this or other embodiments the drive system is connected to the transmission via an output shaft.

Additionally or alternatively, in this or other embodiments a translational thrust system includes a propeller operably connected to the drive system via the output shaft.

Additionally or alternatively, in this or other embodiments a propeller gear reduction operably connects the propeller to the output shaft. The propeller gear reduction includes a tail sun gear fixed to the output shaft, a fixed tail ring gear and a plurality of tail planet gears rotatably secured to a propeller shaft and operably connected to the tail sun gear and the tail ring gear, such that rotation of the output shaft drives rotation of the propeller shaft.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Figure 1:
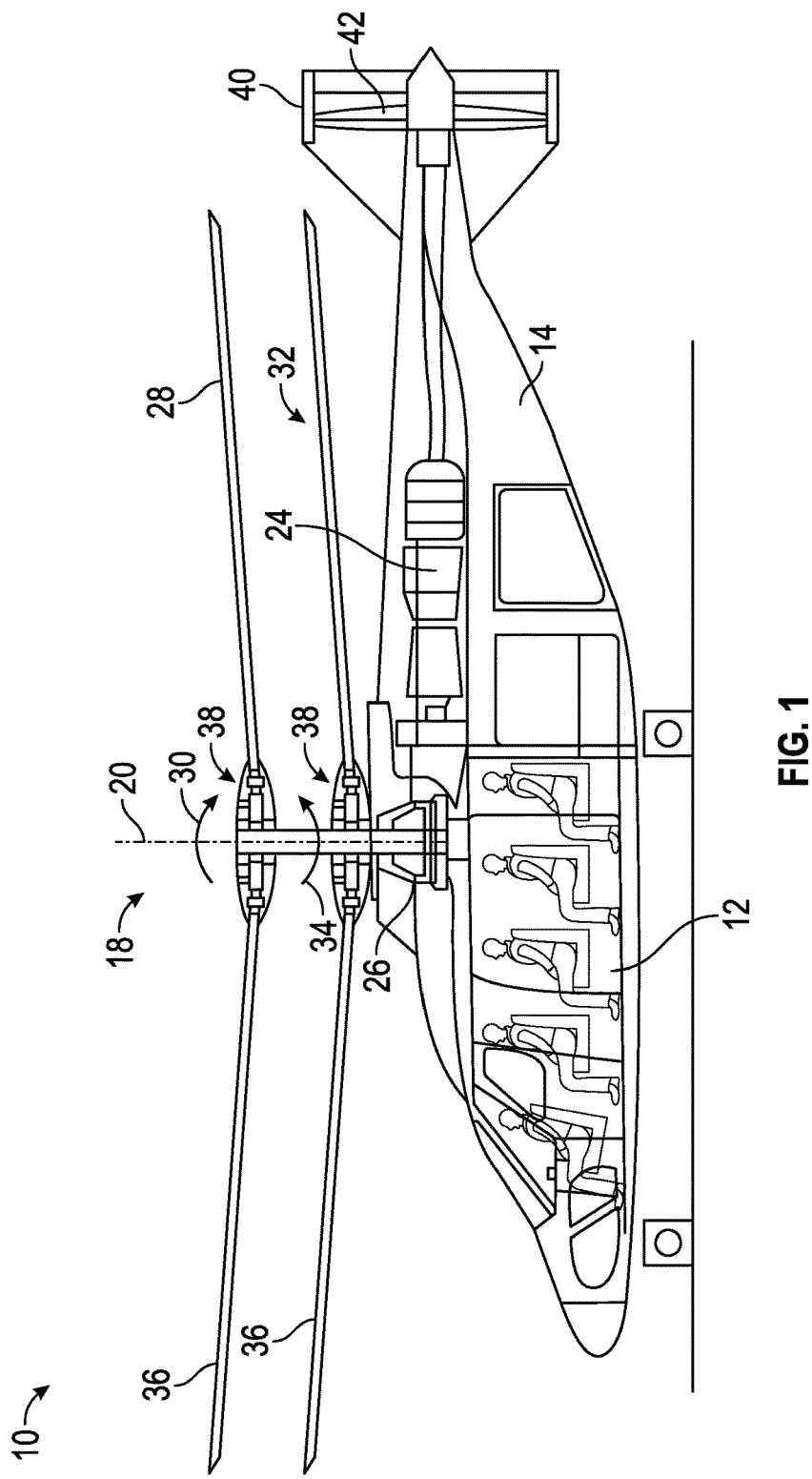
FIG. 1 is a schematic view of an embodiment of a rotary wing aircraft.

Shown in FIG. 1 is schematic view of an embodiment of a rotary wing aircraft, in this embodiment a helicopter 10. The helicopter 10 includes an airframe 12 with an extending tail 14. A dual, counter rotating coaxial main rotor assembly 18 is located at the airframe 12 and rotates about a main rotor axis 20. The main rotor assembly 18 is driven by a power source, for example, an engine 24 via a transmission 26. The main rotor assembly 18 includes an upper rotor assembly 28 driven in a first direction 30 about the main rotor axis 20, and a lower rotor assembly 32 driven in a second direction 34 about the main rotor axis 20, opposite to the first direction 30. While, in FIG. 1, the first direction 30 is illustrated as counter-clockwise and the second direction 34 is illustrated as clockwise, it is to be appreciated that in some embodiments the directions of rotation of the upper rotor assembly 28 and lower rotor assembly 32 may be reversed. Each of the upper rotor assembly 28 and the lower rotor assembly 32 include a plurality of rotor blades 36 secured to a rotor hub 38. In some embodiments, the helicopter 10 further includes a translational thrust system 40 located at the extending tail 14 to provide translational thrust for the helicopter 10. The translational thrust system 40 includes a propeller rotor 42 connected to and driven by the engine 24 via the gearbox 26. While shown in the context of a pusher-prop configuration, it is understood that the propeller rotor 42 could also be more conventional puller prop or could be variably facing so as to provide yaw control in addition to or instead of translational thrust.

Figure 2:
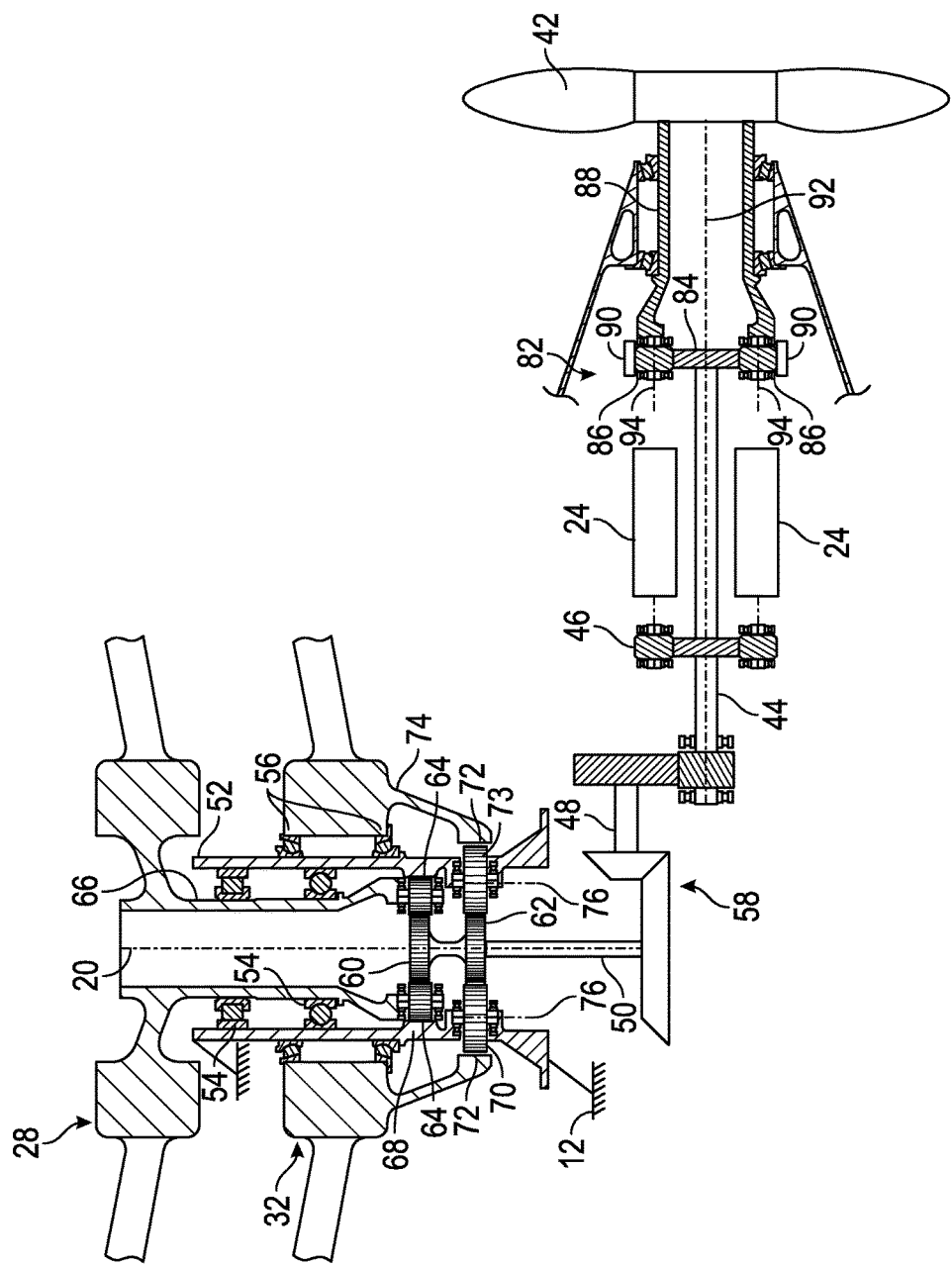
FIG. 2 is a schematic view of a drivetrain for an embodiment of a dual coaxial rotor system.

Referring to FIG. 2, in some embodiments the helicopter 10 has two engines 24 connected to an output shaft 44 via, for example, a gear reduction 46. The output shaft 44 drives a transfer shaft 48 which in turn drives a rotor input shaft 50 via, for example, a bevel gear mesh 58. The rotor input shaft 50, as will be explained below, drives rotation of the upper rotor assembly 28 and the lower rotor assembly 32 about the main rotor axis 20. The upper rotor assembly 28 and the lower rotor assembly 32 are supported at the main rotor axis by a static mast 52, which is fixed to the airframe 12. The assembly includes one or more upper rotor bearings 54 located between the static mast 52 and the upper rotor assembly 28 to support the upper rotor assembly 28 at the static mast 52. Further, one or more lower rotor bearings 56 are located between the static mast 52 and the lower rotor assembly 32 to support the lower rotor assembly 32 at the static mast 52. While not required in all aspects, the static mast 52 can extend between the rotor assemblies 28, 32 as shown, and can have elements (such as an aerodynamic fairing, electronics, sensors etc.) attached thereto.

Figure 3:
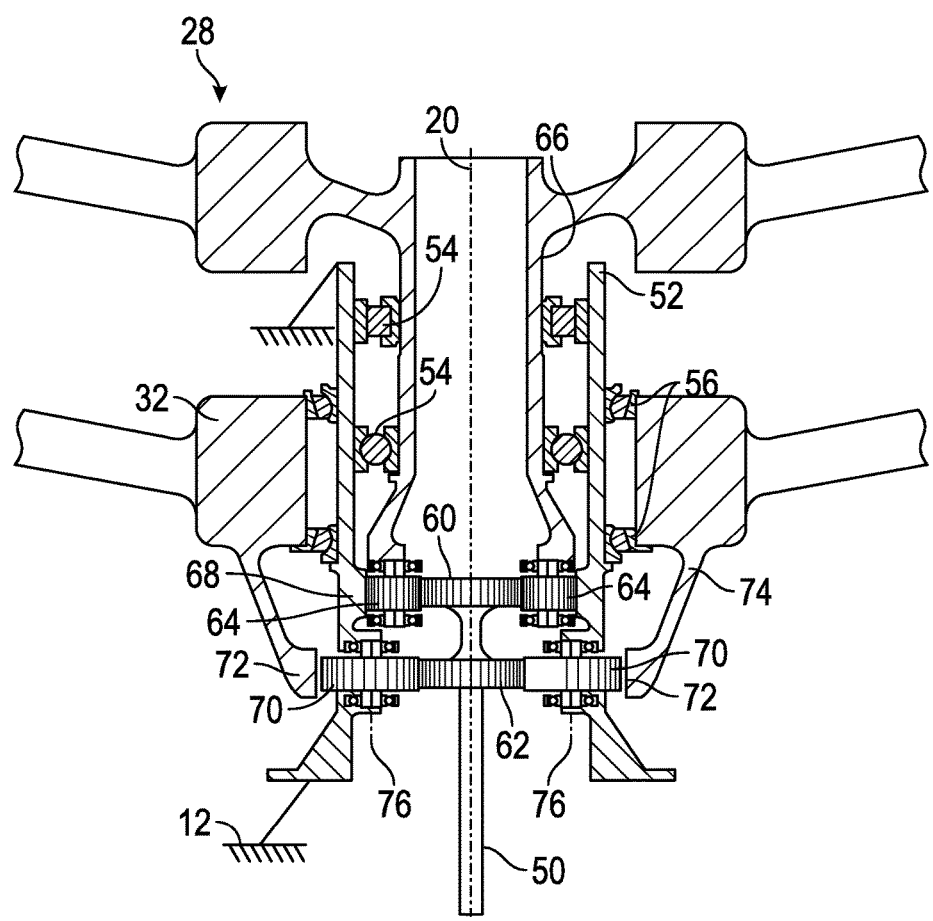
FIG. 3 is a cross-sectional view of an embodiment of transmission for a dual coaxial rotor system.
Figure 4:
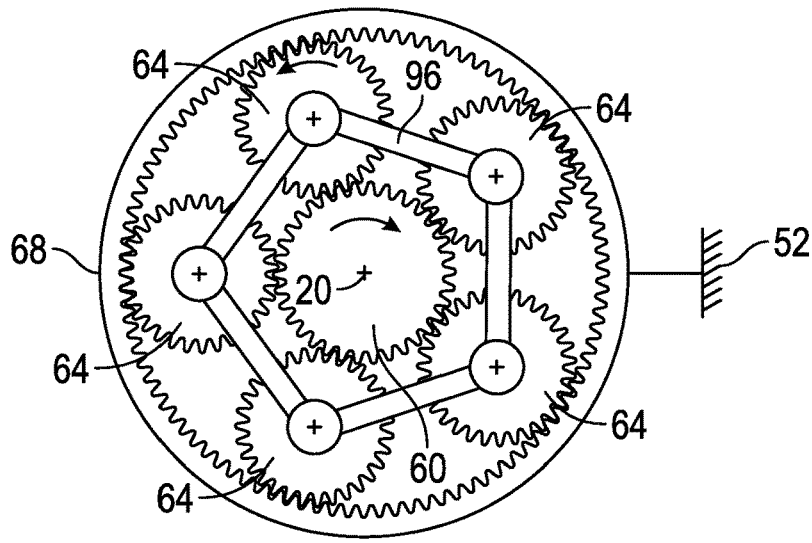
FIG. 4 is a view of an embodiment of a planetary gear arrangement to arrangement to drive an upper rotor system.

Referring now to FIGS. 3 and 4, the rotor input shaft 50 includes an upper sun gear 60 and a lower sun gear 62. The upper rotor assembly 28 is driven by a planetary gear arrangement. The upper sun gear 60 interacts with a plurality of planet gears 64 rotatably secured to an upper rotor shaft 66, in some embodiments via an upper carrier 96. The planet gears 64 also interacting with an upper ring gear 68 fixed to the static mast 52. The upper sun gear 60 rotation drives rotation of the planet gears 64 about the main rotor axis 20, thus driving the upper rotor shaft 66 and upper rotor assembly 28 to rotate about the main rotor axis 20. In some embodiments, a reduction at the planetary gear arrangement is 3:1.

Figure 5:
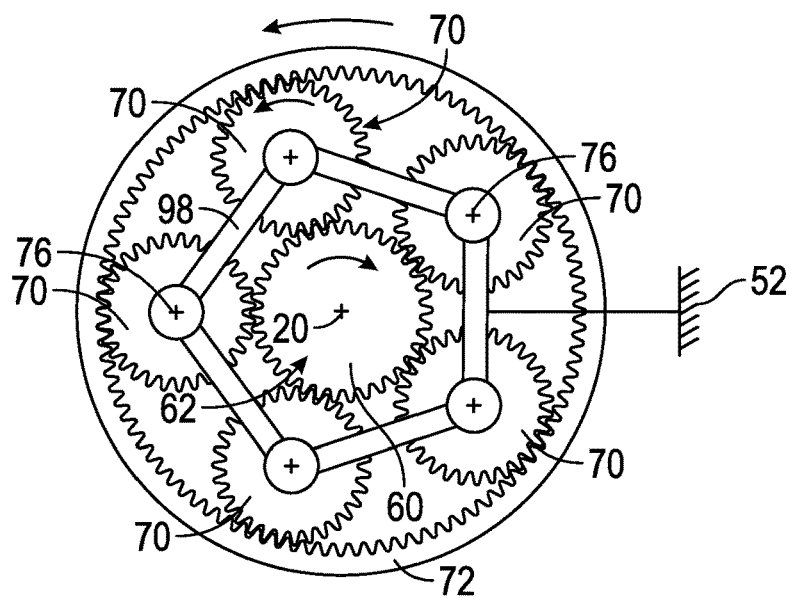
FIG. 5 is a view of an embodiment of a star gear arrangement to drive a lower rotor system.

Referring now to FIGS. 3 and 5, the lower rotor assembly 32 is driven by a star gear arrangement. The lower sun gear 62 interacts with a plurality of star gears 70 rotatably fixed to the static mast 52 in some embodiments via a lower carrier 98. The star gears 70 also interact with a lower ring gear 72 fixed to a lower rotor shaft 74 of the lower rotor assembly 32. Rotation of the lower sun gear 62 about the main rotor axis 20 rotates each of the star gears 70 about a respective star gear axis 76, urging rotation of the lower ring gear 72, and thus the lower rotor assembly 32 about the main rotor axis 20. In some embodiments, reduction at the star gear arrangement is 3:1.

Referring again to FIG. 2, the propeller rotor 42 is driven by the output shaft 44 via a propeller gear reduction 82. The propeller gear reduction 82 includes a tail sun gear 84 fixed to the output shaft 44, which interacts with a plurality of tail planet gears 86 rotatably fixed to a propeller shaft 88. The tail planet gears 86 also interact with a fixed tail ring gear 90. Rotation of the output shaft 44 about an output shaft axis 92 rotates the tail sun gear 84 about the output shaft axis 92. This, in turn, drives rotation of the tail planet gears 86 about their respective tail planet gear axes 94, and through interaction with the tail ring gear 90, results in rotation of the propeller shaft 88 and thus the propeller rotor 42 about the output shaft axis 44. While shown with a particular gear arrangement, it is understood that the propulsor such as the propeller rotor 42 can be driven by other mechanical and/or electrical arrangements.

Further, while shown with the tail planet gears 86, where a coaxial propeller rotor system is used in which counter rotating propeller rotors 42 are used, the planetary and star systems described above could also be used for the propeller rotor system in addition to or instead of used in relation to the rotor assembly 18. Further, aspects could be used in counter rotating propeller rotors 42 in fixed wing applications.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. For instance, aspects can be used with propeller assemblies, turbines, and/or fans. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A coaxial, dual rotor system comprising:
   a first rotor assembly disposed at a rotor axis and rotatable thereabout;
   a second rotor assembly disposed at the rotor axis radially inboard of the first rotor assembly and rotatable thereabout;
   a rotationally fixed static mast disposed radially between the first rotor assembly and the second rotor assembly; and
   a transmission including:
      a rotor input shaft including a first sun gear and a second sun gear;
      a star gear arrangement operably connected to the first sun gear and the static mast to drive rotation of the first rotor assembly about the rotor axis; and
      a planetary gear arrangement operably connected to the second sun gear and the static mast to drive rotation of the second rotor assembly about the rotor axis.

2. The rotor system of claim 1, wherein the star gear arrangement includes:
   a plurality of star gears interactive with the first sun gear, the plurality of star gears disposed at the static mast and rotatably secured thereto; and
   a first ring gear fixed to the first rotor assembly and interactive with the plurality of star gears to transfer rotation of the first sun gear to the first rotor assembly via the plurality of star gears.

3. The rotor system of claim 1, wherein the planetary gear arrangement includes:
   a second ring gear fixed to the static mast; and
   a plurality of planet gears rotatably secured to the second rotor assembly and interactive with the second sun gear and the second ring gear, the rotation of the second sun gear thus driving rotation of the second rotor assembly about the rotor axis.

4. The rotor system of claim 1, wherein the first rotor assembly is driven in a first direction about the rotor axis and the second rotor assembly is driven about the rotor axis in a second direction opposite to the first direction.

5. The rotor system of any of claim 1, further comprising a first rotor bearing to support the first rotor assembly at the static mast.

6. The rotor system of claim 1, further comprising a second rotor bearing to support the second rotor assembly at the static mast.

7. A dual coaxial rotor rotorcraft comprising:
   an airframe;
   a drive system disposed at the airframe; and
   a coaxial, dual rotor system operably connected to the drive system including:
      a first rotor assembly disposed at a rotor axis and rotatable thereabout;
      a second rotor assembly disposed at the rotor axis radially inboard of the first rotor assembly and rotatable thereabout;
      a rotationally fixed static mast disposed radially between the first rotor assembly and the second rotor assembly and fixed to the airframe; and
      a transmission including:
         a rotor input shaft including a first sun gear and a second sun gear;
         a star gear arrangement operably connected to the first sun gear and the static mast to drive rotation of the first rotor assembly about the rotor axis; and
         a planetary gear arrangement operably connected to the second sun gear and the static mast to drive rotation of the second rotor assembly about the rotor axis.

8. The rotorcraft of claim 7, wherein the star gear arrangement includes:
   a plurality of star gears interactive with the first sun gear, the plurality of star gears disposed at the static mast and rotatably secured thereto; and
   a first ring gear fixed to the first rotor assembly and interactive with the plurality of star gears to transfer rotation of the first sun gear to the first rotor assembly via the plurality of star gears.

9. The rotorcraft of claim 7, wherein the planetary gear arrangement includes:
   a second ring gear fixed to the static mast; and
   a plurality of planet gears rotatably secured to the second rotor assembly and interactive with the second sun gear and the second ring gear, the rotation of the second sun gear thus driving rotation of the second rotor assembly about the rotor axis.

10. The rotorcraft of claim 7, wherein the first rotor assembly is driven in a first direction about the rotor axis and the second rotor assembly is driven about the rotor axis in a second direction opposite to the first direction.

11. The rotorcraft of claim 7, further comprising a first rotor bearing to support the first rotor assembly at the static mast.

12. The rotorcraft of claim 7, further comprising a second rotor bearing to support the second rotor assembly at the static mast.

13. The rotorcraft of claim 7, wherein the drive system is connected to the transmission via an output shaft.

14. The rotorcraft of claim 7, further comprising a translational thrust system including a propeller operably connected to the drive system via the output shaft.

15. The rotorcraft of claim 14, further comprising a propeller gear reduction to operably connect the propeller to the output shaft, the propeller gear reduction including:
   a tail sun gear fixed to the output shaft;
   a fixed tail ring gear; and
   a plurality of tail planet gears rotatably secured to a propeller shaft and operably connected to the tail sun gear and the tail ring gear, such that rotation of the output shaft drives rotation of the propeller shaft.

* * * * *